(12) United States Patent
Bao

(10) Patent No.: US 11,196,828 B2
(45) Date of Patent: Dec. 7, 2021

(54) METHOD, APPARATUS, DEVICE AND COMPUTER STORAGE MEDIUM FOR DETERMINING SOURCE CHANNEL

(71) Applicant: Beijing Baidu Netcom Science and Technology Co., Ltd., Beijing (CN)

(72) Inventor: Wenbin Bao, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/184,259

(22) Filed: Feb. 24, 2021

(65) Prior Publication Data

US 2021/0274005 A1    Sep. 2, 2021

(30) Foreign Application Priority Data

Feb. 28, 2020    (CN) .......................... 202010130214.6

(51) Int. Cl.
| | | |
|---|---|---|
| *G06F 15/16* | (2006.01) | |
| *H04L 29/08* | (2006.01) | |
| *G06F 8/61* | (2018.01) | |
| *G06F 8/65* | (2018.01) | |

(52) U.S. Cl.
CPC ............... *H04L 67/22* (2013.01); *G06F 8/61* (2013.01); *G06F 8/65* (2013.01)

(58) Field of Classification Search
CPC ..... H04L 67/22; H04L 29/08072; G06F 8/61; G06F 8/65
USPC ........................ 709/220, 224, 226, 228, 232
See application file for complete search history.

(56) References Cited

U.S. PATENT DOCUMENTS

| | | | | |
|---|---|---|---|---|
| 8,566,839 B2* | 10/2013 | Johnson | ............ | H04M 1/72403 719/310 |
| 8,750,841 B2* | 6/2014 | Johnson | ............ | H04M 3/53366 455/414.1 |
| 8,887,177 B2* | 11/2014 | Johnson | ............ | H04M 1/72436 719/318 |

(Continued)

FOREIGN PATENT DOCUMENTS

| | | |
|---|---|---|
| CN | 105282254 B | 5/2018 |
| CN | 110825424 A | 2/2020 |

OTHER PUBLICATIONS

European Search Report, EP Application No. 21159327.2, dated Jul. 6, 2021, 10 pages.

*Primary Examiner* — Khanh Q Dinh
(74) *Attorney, Agent, or Firm* — Brian N. Young; Fountainhead Law Group P.C.

(57) ABSTRACT

A method, apparatus, device and computer storage medium for determining a source channel are disclosed. A specific implementation solution is as follows: determining an interval between a time when an application is opened for the first time and an installation time of the application; if the interval exceeds a preset duration threshold, determining a source channel of the application according to channel information carried by an installation package of the application; if the interval does not exceed the preset duration threshold, determining the source channel of the application according to channel information transferred to the application when the application is opened for the first time. The present disclosure can improve the accuracy of the source channel of the application.

17 Claims, 7 Drawing Sheets

(56) References Cited

U.S. PATENT DOCUMENTS

| | | | | |
|---|---|---|---|---|
| 8,990,793 | B1* | 3/2015 | Fong-Jones | G06F 8/61 |
| | | | | 717/168 |
| 9,524,159 | B2* | 12/2016 | Fong-Jones | G06F 8/65 |
| 10,990,461 | B2* | 4/2021 | Dong | H04L 67/28 |
| 2010/0235748 | A1* | 9/2010 | Johnson | H04M 1/6505 |
| | | | | 715/730 |
| 2013/0147938 | A1* | 6/2013 | McCloskey | A61F 9/02 |
| | | | | 348/78 |
| 2013/0295925 | A1* | 11/2013 | Jacob | H04J 11/0069 |
| | | | | 455/434 |
| 2015/0024729 | A1* | 1/2015 | Johnson | H04M 1/72403 |
| | | | | 455/418 |
| 2018/0254919 | A1* | 9/2018 | Van De Velde | H04W 88/16 |
| 2019/0028423 | A1* | 1/2019 | Ledwith | H04L 51/36 |

* cited by examiner

METHOD, APPARATUS, DEVICE AND COMPUTER STORAGE MEDIUM FOR DETERMINING SOURCE CHANNEL

The present application claims the priority of Chinese Patent Application No. 202010130214.6, filed on Feb. 28, 2020, with the title of "Method, apparatus, device and computer storage medium for determining source channel". The disclosure of the above application is incorporated herein by reference in its entirety.

FIELD OF THE DISCLOSURE

The present disclosure relates to the technical field of computer applications, and particularly to a method, apparatus, device and computer storage medium for determining a source channel.

BACKGROUND OF THE DISCLOSURE

An application (APP) is usually published through multiple channels for downloading and installation by users, for example, an installation package of the APP is pre-installed in a terminal, the installation package of the APP is downloaded from an application store, or the download of the APP is triggered by a link in a webpage, etc. To distinguish channel quality and optimize newly-added users, the source channels of the APP usually needs to be counted, and therefore a method for determining the source channels of the APP is needed.

SUMMARY OF THE DISCLOSURE

In view of the above issue, the present disclosure provides a method, apparatus, device and computer storage medium for determining a source channel, to facilitate improving the accuracy in recognizing the source channel of the APP.

In a first aspect, the present disclosure provides a method of determining a source channel, the method comprising:
  determining an interval between a time when an application is opened for the first time and an installation time of the application;
  if the interval exceeds a preset duration threshold, determining a source channel of the application according to channel information carried by an installation package of the application;
  if the interval does not exceed the preset duration threshold, determining the source channel of the application according to channel information transferred to the application when the application is opened for the first time.

According to a preferred embodiment of the present disclosure, if a manner in which the application is opened for the first time is that the application is awoken through a webpage or by pushing, the channel information is transferred to the application through a link included in the webpage or push;
  if a manner in which the application is opened for the first time is that the application is opened manually, the channel information is transferred to the application by a clipboard.

According to a preferred embodiment of the present disclosure, the method is implemented when the application is opened for the first time, and the method further comprises:
  sending, by the application, the information including the source channel to a server side so that the server side counts a newly-added user of the application.

According to a preferred embodiment of the present disclosure, the method is implemented by a server side to count a newly-added user of the application;
  the method further comprises:
  receiving, by the server side, information uploaded when the application is opened for the first time, the information comprising: the time when the application is opened for the first time, the installation time of the application, an application-opening manner, the channel information carried by the installation package of the application and the channel information transferred to the application when the application is opened for the first time.

According to a preferred embodiment of the present disclosure, the information further comprises: an identifier of the application and an identifier of a terminal device;
  the method further comprises:
  judging, by the server side, whether the application is installed on the terminal device for the first time according to the identifier of the application and the identifier of the terminal device, and if YES, counting a newly-added user of the application by using the information of the source channel.

According to a preferred embodiment of the present disclosure, the method further comprises:
  if the channel information transferred to the application is not obtained when the application is opened for the first time, determining the source channel of the application according to the channel information carried by the installation package of the application.

In a second aspect, the present disclosure further provides an electronic device, comprising:
  at least one processor; and
  a memory communicatively connected with the at least one processor;
  wherein the memory stores instructions executable by the at least one processor, and the instructions are executed by the at least one processor to enable the at least one processor to perform a method of determining a source channel, wherein the method comprises:
  determining an interval between a time when an application is opened for the first time and an installation time of the application;
  if the interval exceeds a preset duration threshold, determining a source channel of the application according to channel information carried by an installation package of the application;
  if the interval does not exceed the preset duration threshold, determining the source channel of the application according to channel information transferred to the application when the application is opened for the first time.

According to a preferred embodiment of the present disclosure, if a manner in which the application is opened for the first time is that the application is awoken through a webpage or by pushing, the channel information is transferred to the application through a link included in the webpage or push;
  if a manner in which the application is opened for the first time is that the application is opened manually, the channel information is transferred to the application by a clipboard.

According to a preferred embodiment of the present disclosure, the method is implemented when the application is opened for the first time, and the method further comprises:
  sending, by the application, the information including the source channel to a server side so that the server side counts a newly-added user of the application.

According to a preferred embodiment of the present disclosure, the method is implemented by a server side to count a newly-added user of the application;

the method further comprises:

receiving, by the server side, information uploaded when the application is opened for the first time, the information comprising: the time when the application is opened for the first time, the installation time of the application, an application-opening manner, the channel information carried by the installation package of the application and the channel information transferred to the application when the application is opened for the first time.

According to a preferred embodiment of the present disclosure, the information further comprises: an identifier of the application and an identifier of a terminal device;

the method further comprises:

judging, by the server side, whether the application is installed on the terminal device for the first time according to the identifier of the application and the identifier of the terminal device, and if YES, counting a newly-added user of the application by using the information of the source channel.

According to a preferred embodiment of the present disclosure, if the channel information transferred to the application is not obtained when the application is opened for the first time, determining the source channel of the application according to the channel information carried by the installation package of the application.

In a third aspect, the present disclosure further provides a non-transitory computer readable storage medium with computer instructions stored thereon, wherein the computer instructions are used for causing a computer to perform a method of determining a source channel, wherein the method comprises:

determining an interval between a time when an application is opened for the first time and an installation time of the application;

if the interval exceeds a preset duration threshold, determining a source channel of the application according to channel information carried by an installation package of the application;

if the interval does not exceed the preset duration threshold, determining the source channel of the application according to channel information transferred to the application when the application is opened for the first time.

As can be seen from the above technical solutions, in the present disclosure, a specific manner in which the source channel of the application is recognized is determined according to the interval between the time when the APP is opened for the first time and the installation time, thereby improving the accuracy in recognizing the source channel of the APP.

Other effects of the above optional modes will be described below in conjunction with specific embodiments.

BRIEF DESCRIPTION OF DRAWINGS

The figures are intended to facilitate understanding the solutions, not to limit the present disclosure. In the figures.

DETAILED DESCRIPTION OF PREFERRED EMBODIMENTS

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Figure 1:
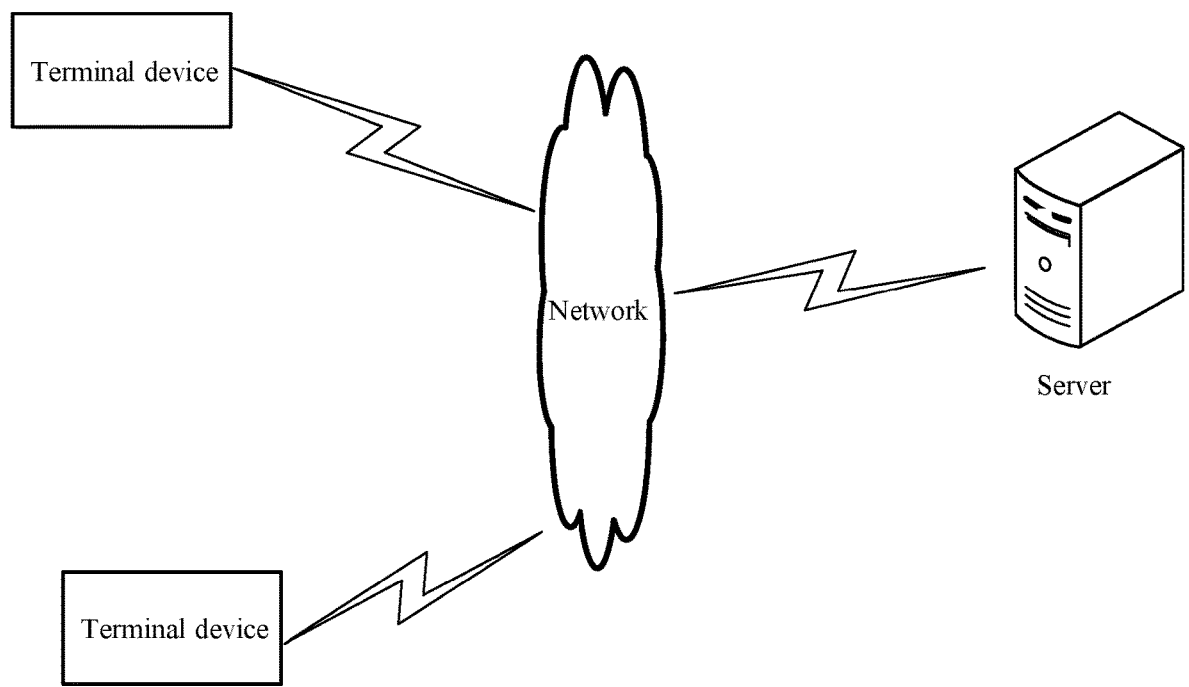
FIG. 1 illustrates an exemplary system architecture to which embodiments of the present disclosure may be applied.
Figure 2:
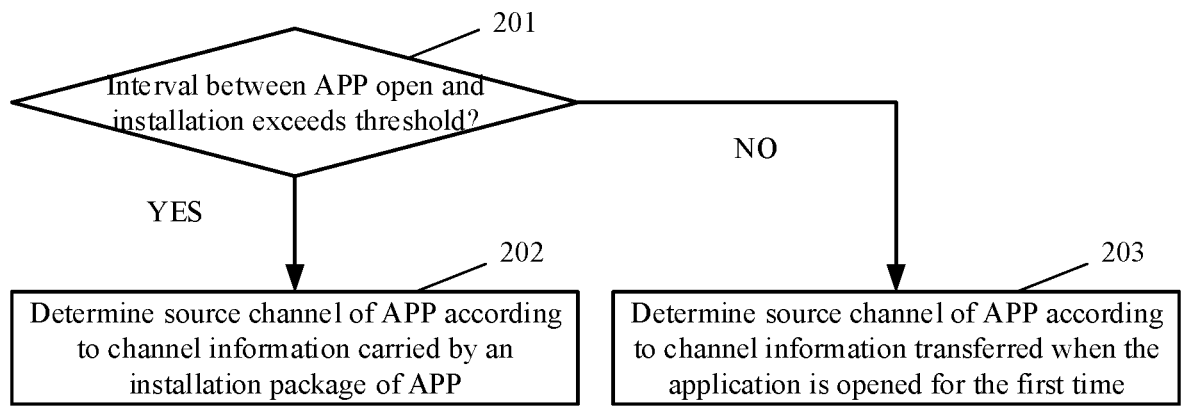
FIG. 2 illustrates a flow chart of a main method according to the present disclosure.

FIG. 1 illustrates an exemplary system architecture to which embodiments of the present disclosure may be applied. As shown in FIG. 1, the system architecture may comprise a terminal device, a network and a server. The network is used to provide a medium for a communication link between the terminal device 101 and the server. The network may comprise various connection types such as wired link, a wireless communication link or an optical fiber cable.

The user may use the terminal device to interact with the server via the network. The terminal device may be installed with various applications such as voice interaction applications, webpage browser applications, communication-type applications, information-orientated applications etc.

The terminal device may be various electronic devices, including but not limited to smart phones, tablet computers, PCs, smart home devices and smart wearable devices. An apparatus for determining a source channel according to the present disclosure may be provided and runs on or in the terminal device, or provided and runs in the server. The apparatus may be implemented as multiple software or software modules (e.g., used to provide distributed services), or as a single software or software module, which will not be defined in detail.

For example, the apparatus for determining a source channel is provided and runs on the terminal device. The apparatus can determine a source channel of an application in the terminal device in a manner provided by embodiments of the present disclosure, and reports the source channel information to the server so that the server can count the newly-added user of the application. For another example, the apparatus for determining a source channel is provided and runs on the server, the server receives information uploaded when the application is opened for the first time, determines the source channel of the application according to the uploaded information and thereby count the newly-added user of the application.

The server may be a single server, or a server group comprised of a plurality of servers. It should be appreciated that the number of the terminal device, network and server in FIG. 1 is only for illustrative purpose. There may be any number of terminal devices, networks and servers according to needs in the implementation.

Since the installation and opening of an application are separate operations, there will exist many installation-opening combinations. For example, the APP is downloaded and installed through a link on webpage A and awoken through a link on webpage B; again for example, the APP is downloaded from an application market and installed, the APP is awoken through a link on webpage A; as another example, when the download of the APP is triggered through a link on webpage A, the APP is intercepted by an application store (application market), and the APP is downloaded and installed from the application store; and so on. If the source channel of the APP is determined only by virtue of the channel information transferred when the APP is opened for the first time, or the source channel of the application is determined only by virtue of the channel information carried by the installation package of the application, inaccuracy in determining the source channel will be caused. In view of this, a main method according to the present disclosure as shown in the flow chart comprises the following steps:

At 201, an interval between a time when the APP is opened for the first time and an installation time of the APP is determined, 202 will be performed if the interval exceeds a preset duration threshold; otherwise 203 will be performed.

At 202, the source channel of the APP is determined according to channel information carried by the APP installation package.

At 203, the source channel of the APP is determined according to the channel information of the APP transferred when the APP is opened for the first time.

The above method will be described below in detail in conjunction with embodiments.

Embodiment 1

Figure 3:
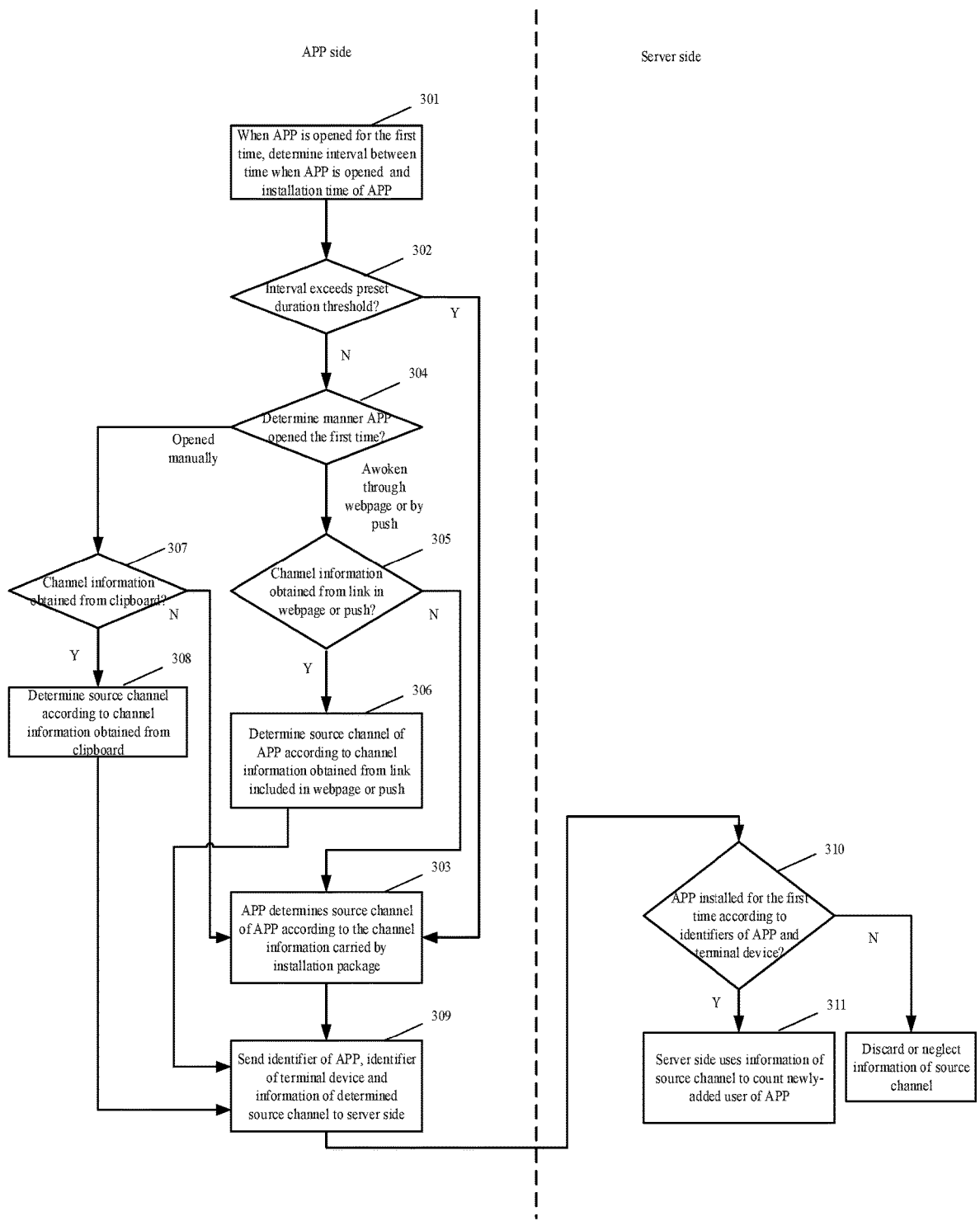
FIG. 3 illustrates a flow chart of a method according to Embodiment 1 of the present disclosure.

FIG. 3 illustrates a flow chart of a method according to Embodiment 1 of the present disclosure. In the present embodiment, the determination of the source channel is implemented at the APP side (client). As shown in FIG. 3, the method may comprise the following steps:

At 301, when the APP is opened for the first time, an interval between a time when the APP is opened for the first time and an installation time of the APP is determined.

When the APP is opened for the first time, an "APP already-opened" identifier is marked in the terminal device, and the identifier will not be deleted when the APP is unloaded. When the APP is opened, if the "already-opened" identifier already exists in the terminal device, it will be believed that the APP is opened not for the first time; if the "already-opened" identifier has not yet existed in the terminal device, it will be believed that the APP is opened for the first time.

In addition, when the application is installed, the installation time will be recorded. In this step, the APP may determine the interval between the installation time and the time when the APP is opened for the first time according to the recorded installation time and the time when the APP is opened for the first time.

At 302, judgment is made as to whether the interval exceeds a preset duration threshold, and 303 will be performed if YES; otherwise 304 will be performed.

The duration of the interval is judged to correct the source channel. The duration threshold may be determined depending on a total duration needed from the download and installation of the APP to direct opening of the APP, and may employ an empirical value or experimental value. The duration threshold is usually measured by minute, e.g., 5 minutes.

At 303, the APP determines the source channel of the APP according to the channel information carried by the installation package, and performs 309.

If the interval exceeds the preset duration threshold, it may be believed that the user does not open the APP in time after it is installed, and probably opens the APP through another channel after a period of time. Hence, when the source channel of the APP is determined, the channel through which the APP is downloaded and installed should prevail, i.e., the channel information carried by the installation package should prevail.

If the installation package of the APP is pre-installed by the mobile phone manufacturer, or downloaded from the application store or an operation activity webpage, the installation package will carry corresponding channel information, for example, the mobile phone manufacturer's identifier, the identifier of the application store or the identifier of the operation activity, etc.

At 304, a manner in which the APP is opened for the first time is determined, and 305 will be performed if the APP is awoken through the webpage or by pushing; 307 will be performed if the APP is opened manually.

The manner in which the APP is opened mainly includes: awoken through a webpage, awoken by pushing, manually opened, etc.

That the APP is awoken through a webpage may for example be that the APP is awoken through a webpage such as an operation activity or fee payment promotion. For example, after the user clicks a link in a HTML5 webpage, the click triggers the skip to open the APP. That the APP is awoken by pushing for example may be that the APP is awoken by pushing a message or by a pushing service of another APP. For example, after the user clicks a link in the pushed message, the click triggers the skip to open the APP. The channel information may be carried in the link of the above webpage or push and transferred to the APP as a parameter.

If the awaking by the webpage or pushing fails, the channel information may be written into a clipboard, and transferred to the APP through the clipboard.

That the APP is opened manually for example may be that the APP is opened after the user click the icon of the APP in the terminal device, or the APP is opened by inputting a command in the terminal device.

At 305, the APP judges whether the channel information is obtained from the link included in the webpage or the push, and performs 306 if YES; otherwise performs 303.

At 306, the source channel of the APP is determined according to the channel information obtained from the link included in the webpage or the push, and 309 is performed.

If the APP is opened for the first time through the webpage or by pushing, the channel information will be preferably obtained from the link included in the webpage or push, as the source channel. If the link included by the webpage or push does not include the channel information, the channel information carried by the installation package of the APP will be determined as the source channel of the APP.

At 307, the APP judges whether the channel information is obtained from the clipboard, and performs 308 if YES; or performs 303 if NO.

At 308, the source channel of the APP is determined according to the channel information obtained from the clipboard, and 309 is performed.

If the APP is opened for the first time manually, the channel information will be preferably obtained from the clipboard, as the source channel. If the clipboard does not include the channel information, the channel information carried by the installation package of the APP will be determined as the source channel of the APP.

At 309, the APP sends the identifier of the APP, the identifier of the terminal device and the information of the determined source channel to the server side.

The APP may allow the message sent to the server side to carry the identifier of the APP, the identifier of the terminal device and the information of the determined source channel, so that the server side can count the newly-added user of the APP.

At 310, the server side judges whether the APP is installed on the terminal device for the first time according to the identifier of the APP and the identifier of the terminal device, and performs 311 if YES; otherwise, the server side may discard or neglect the information of the source channel.

The counting of the newly-added user of the APP involved in the present disclosure may be only counting the source channel through which the APP is installed on the terminal device for the first time, wherein after receiving the message including the identifier of the APP, the identifier of the terminal device and the source channel information, the server side locally records a correspondence relationship between the identifier of the APP and the identifier of the terminal device. If the server side receives the message including the channel information from the APP again, the server side may judge whether the correspondence relationship between the two has already been recorded locally according to the identifier of the APP and the identifier of the terminal device carried in the message. If the correspondence relationship already exists locally, this indicates that the APP is installed on the terminal device not for the first time, and the APP might be installed again after being unloaded. The message of this time will not be used to count the newly-added user of the application. If the correspondence relationship does not exist locally, this indicates that the APP is installed on the terminal device for the first time, and the source channel information included in the message may be used to count the newly-added user of the APP.

At 311, the server side uses the information of the source channel to count the newly-added user of the APP.

That is to say, the server side increases one newly-added user of the APP according to the source channel, and finally respectively counts newly-added users according to source channels of the APP, and thereby determines the addition effects of respective channels, thereby performing newly-added application user policy optimization for the APP and reducing the cost at which the APP gains newly-added users.

Embodiment 2

Figure 4:
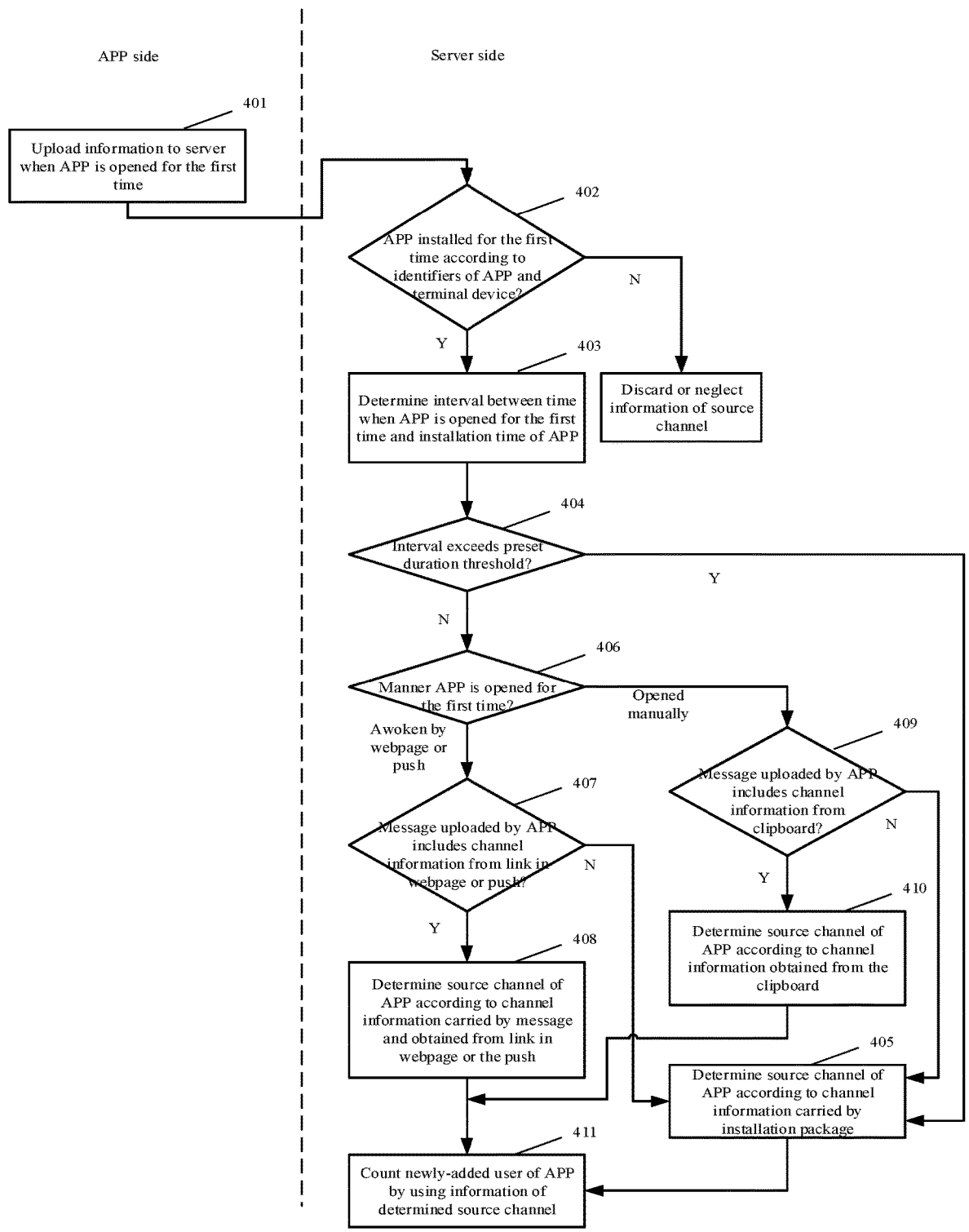
FIG. 4 illustrates a flow chart of a method according to Embodiment 2 of the present disclosure.

FIG. 4 illustrates a flow chart of a method according to Embodiment 2 of the present disclosure. In the present embodiment, the determination of the source channel is implemented at the server side. As shown in FIG. 3, the method may comprise the following steps:

At 401, when the APP is opened for the first time, information is uploaded to the server. The information includes: the identifier of the APP, the identifier of the terminal device, the time when the APP is opened for the first time, the installation time of the APP, the APP-opening manner, the channel information carried by the installation package of the APP and the channel information transferred to the APP when the APP is opened for the first time.

When the APP is opened for the first time, an "APP already-opened" identifier is marked in the terminal device, and the identifier will not be deleted when the APP is unloaded. When the APP is opened, if the "already-opened" identifier already exists in the terminal device, it will be believed that the APP is opened not for the first time; if the "already-opened" identifier has not yet existed in the terminal device, it will be believed that the APP is opened for the first time.

In addition, when the application is installed, the installation time will be recorded. In this step, the APP will send the above information to the server side via a message so that the server side counts the newly-added user after determining the source channel.

At 402, the server side judges whether the APP is installed on the terminal device for the first time according to the identifier of the APP and the identifier of the terminal device, and performs 403 if YES; otherwise, the server side may discard or neglect the information of the source channel.

After receiving the above information from the APP for the first time, the server side locally records a correspondence relationship between the identifier of the APP and the identifier of the terminal device. If the server side receives the above information from the APP again, the server side may judge whether the correspondence relationship between the two has already been recorded locally according to the identifier of the APP and the identifier of the terminal device carried therein. If the correspondence relationship already exists locally, this indicates that the APP is installed on the terminal device not for the first time, and the APP might be installed again after being unloaded. The message of this time will not be used to count newly-added user of the application. If the correspondence relationship does not exist locally, this indicates that the APP is installed on the terminal device for the first time, and the source channel information included in the message may be used to count the newly-added user of the APP, and the flow proceeds to 403.

At 403, the server side determines an interval between a time when the APP is opened for the first time and an installation time of the APP.

At 404, the server side judges whether the interval exceeds a preset duration threshold, and performs 405 if YES; or performs 406 if NO.

The duration of the interval is judged to correct the source channel. The duration threshold may be determined depending on a total duration needed from the download and installation of the APP to direct opening of the APP, and may employ an empirical value or experimental value. The duration threshold is usually measured by minute, e.g., 5 minutes.

At 405, the server side determines the source channel of the APP according to the channel information carried by the installation package, and performs 411.

If the interval exceeds the preset duration threshold, it may be believed that the user does not open the APP in time after it is installed, and probably opens the APP through another channel after a period of time. Hence, when the source channel of the APP is determined, the channel through which the APP is downloaded and installed should prevail, i.e., the channel information carried by the installation package should prevail.

If the installation package of the APP is pre-installed by the mobile phone manufacturer, or downloaded from the application store or an operation activity webpage, the installation package will carry corresponding channel information, for example, the mobile phone manufacturer's identifier, the identifier of the application store or the identifier of the operation activity, etc.

At 406, the server side determines a manner in which the APP is opened for the first time, and performs 407 if the APP is awoken through the webpage or by pushing; or performs 409 if the APP is opened manually.

The manner in which the APP is opened mainly includes: awoken through a webpage, awoken by pushing, manually opened, etc.

That the APP is awoken through a webpage for example may be that the APP is awoken through a webpage such as an operation activity or fee payment promotion. For example, after the user clicks a link in a HTML5 webpage, the click triggers the skip to open the APP. That the APP is awoken by pushing for example may be that the APP is awoken by pushing a message or by a pushing service of another APP. For example, after the user clicks a link in the pushed message, the click triggers the skip to open the APP. The channel information may be carried in the link of the above webpage or push and transferred to the APP as a parameter.

If the awaking by the webpage or pushing fails, the channel information may be written into a clipboard, and transferred to the APP through the clipboard. Alternatively, if the user opens the APP by copying a password, the channel information carried by the password may also be written into the clipboard.

That the APP is opened manually for example may be that the APP is opened after the user click the icon of the APP in the terminal device, or the APP is opened by inputting a command into the terminal device.

At 407, the server side judges whether the message uploaded by the APP includes the channel information obtained from a link included by the webpage or push, and performs 408 if YES; otherwise, performs 405.

At 408, the server side determines the source channel of the APP according to the channel information carried by the message and obtained from the link included in the webpage or the push, and performs 411.

At 409, the server side judges whether the message uploaded by the APP includes the channel information obtained from the clipboard, and performs 410 if YES; otherwise performs 405.

At 410, the server side determines the source channel of the APP according to the channel information obtained from the clipboard, and performs 411.

If the APP is opened for the first time manually, the channel information will be preferably obtained from the clipboard, as the source channel. If the clipboard does not include the channel information, the channel information carried by the installation package of the APP will be determined as the source channel of the APP.

At 411, the server side counts the newly-added user of the APP by using the information of the determined source channel.

The method according to the present disclosure has been described above in detail. An apparatus according to the present disclosure will be described below in detail in conjunction with embodiments.

Embodiment 3

Figure 5A:
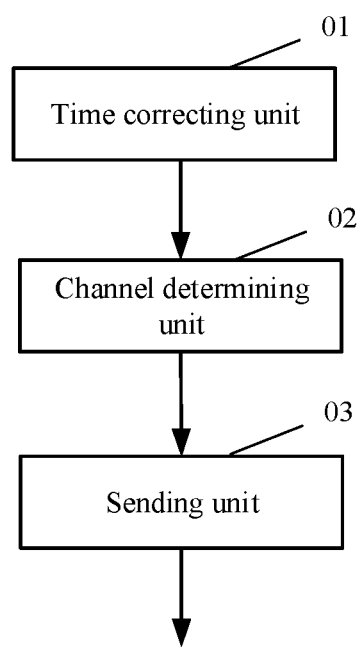
FIG. 5*a* and FIG. 5*b* each illustrates a block diagram of an apparatus for determining a source channel according to Embodiment 3 of the present disclosure.
Figure 5B:
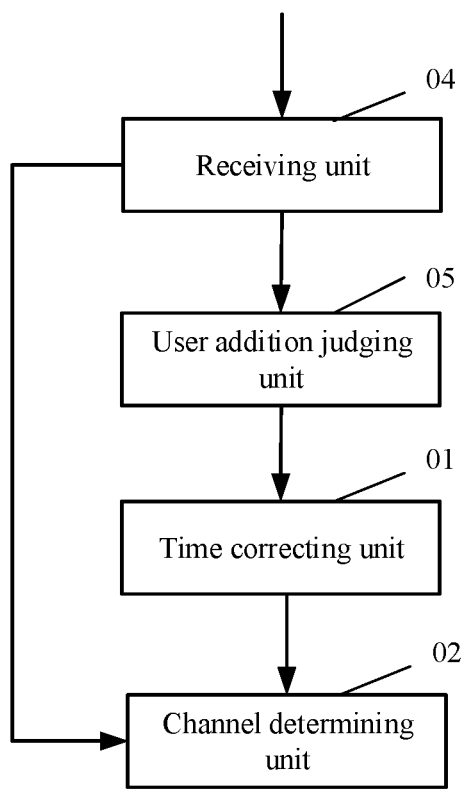

FIG. 5a and FIG. 5b each illustrate a block diagram of an apparatus for determining a source channel according to Embodiment 3 of the present disclosure. As shown in FIG. 5a and FIG. 5b, the apparatus may comprise: a time correcting unit 01 and a channel determining unit 02.

The time correcting unit 01 is configured to determine an interval between a time when the APP is opened for the first time and an installation time of the APP. If the interval exceeds a preset duration threshold, the channel determining unit 02 determines the source channel of the APP according to the channel information carried by the installation package of the APP; if the interval does not exceed the preset duration threshold, the channel determining unit 02 determines the source channel according to the channel information transferred to the APP when the APP is opened for the first time.

If the manner in which the APP is opened for the first time is that the APP is awoken through a webpage or by pushing, the channel information is transferred to the APP through a link included by the webpage or push. If the manner in which the APP is opened for the first time is that the APP is opened manually, the channel information is transferred the APP through the clipboard.

As one of implementation modes, the time correcting unit 01 and channel determining unit 02 are disposed at the APP side, as shown in FIG. 5a.

When the APP is opened for the first time, an "APP already-opened" identifier is marked in the terminal device, and the identifier will not be deleted when the APP is unloaded. When the APP is opened, if the "already-opened" identifier already exists in the terminal device, it will be believed that the APP is opened not for the first time; if the "already-opened" identifier has not yet existed in the terminal device, it will be believed that the APP is opened for the first time.

If the APP is opened for the first time through the webpage or by pushing, the channel determining unit 02 preferably obtains the channel information from the link included in the webpage or push, as the source channel. If the link included by the webpage or push does not include the channel information, the channel determining unit 02 determines the channel information carried by the installation package of the APP as the source channel of the APP.

If the APP is opened for the first time manually, the channel determining unit 02 preferably obtains the channel information from the clipboard, as the source channel. If the clipboard does not include the channel information, the channel determining unit 02 determines the channel information carried by the installation package of the APP as the source channel of the APP.

In addition, when the application is installed, the installation time will be recorded. In this step, the time correcting unit 01 may determine the interval between the installation time and the time when the APP is opened for the first time according to the recorded installation time and the time when the APP is opened for the first time.

In this case, the apparatus may further comprise:
a sending unit 03 configured to send the information including the source channel to the server side so that the server side can count the newly-added user of the APP. The APP may allow the message sent to the server side to carry the identifier of the APP, the identifier of the terminal device and the information of the determined source channel, so that the server side can count the newly-added user of the APP.

As another implementation mode, as shown in FIG. 5b, the time correcting unit 01 and channel determining unit 02 are disposed at the server side, as shown in FIG. 5b. In this way, the apparatus further comprises:

a receiving unit 04 configured to receive the information uploaded when the APP is opened for the first time. The information includes: the time when the APP is opened for the first time, the installation time of the APP, the APP-opening manner, the channel information carried by the installation package of the APP and the channel information transferred to the APP when the APP is opened for the first time.

The above information may further comprise: an identifier of the APP and an identifier of the terminal device.

The apparatus may further comprise:

a user addition judging unit 05 configured to judge whether the APP is installed for the first time on the terminal device, according to the identifier of the APP and the identifier of the terminal device, and if YES, count newly-added user of the APP by using the information of the source channel.

After the receiving unit 04 receives the above information from the APP for the first time, the user addition judging unit 05 locally records a correspondence relationship between the identifier of the APP and the identifier of the terminal device. If the receiving unit 04 receives the above information from the APP again, the user addition judging unit 05 may judge whether the correspondence relationship between the two has already been recorded locally according to the identifier of the APP and the identifier of the terminal device carried therein. If the correspondence relationship already exists locally, this indicates that the APP is installed on the terminal device not for the first time, and the APP might be installed again after being unloaded. The message of this time will not be used to count newly-added user of the application. If the correspondence relationship does not exist locally, this indicates that the APP is installed on the terminal device for the first time, and the user addition judging unit 05 may use the source channel information included in the message to count the newly-added user of the APP.

If the time correcting unit 01 judges that the interval exceeds the preset duration threshold, it may be believed that the user does not open the APP in time after it is installed, and probably opens the APP through another channel after a period of time. Hence, when the channel determining unit 02 determines the source channel of the APP, the channel through which the APP is downloaded and installed should prevail, i.e., the channel information carried by the installation package should prevail.

If the time correcting unit 01 judges that the interval does not exceed the preset duration threshold, a manner in which the APP is opened for the first time will be determined. If the APP is opened for the first time through the webpage or by pushing, the source channel of the APP is preferably determined according to the channel information included by the message and obtained from the link included in the webpage or the push, otherwise the channel information carried by the installation package should prevail. If the APP is opened for the first time manually, the source channel of the APP is preferably determined from the channel information included by the message and obtained from the clipboard.

Several examples will be presented below to illustrate the effect achieved by the method and apparatus according to the present disclosure in improving the recognition accuracy of the source channel of the APP.

Example 1

The user downloads an installation package of the APP from the application market A and then installs the APP, but does not open the APP at that time. After a very long period of time, the user opens the APP through a webpage of an operation activity B forwarded by other users for sharing. Although the parameters transferred by the link of the webpage of the operation activity A to the APP include the information of the operation activity B, since the interval between the time when the APP is opened for the first time and the installation time exceeds the preset duration threshold, the information of the application market A carried by the installation package is still determined as the source channel of the APP.

Example 2

The user triggers the download and installation of the APP by copying a password. Although the channel information is written into the clipboard during the copying of the password, the user overwrites the channel information in the clipboard because the user copies other information after the installation of the APP and prior to the opening of the APP. In the manner provided by the present disclosure, after the user opens the APP manually, the source channel of the APP is preferably determined according to the channel information in the clipboard, but if the channel information does not exist in the clipboard, the source channel of the APP will still be determined according to the channel information carried by the installation package.

Example 3

The user triggers the download of the APP through the webpage of the operation activity A, but the download is intercepted by an application store, and then the installation package of the APP is downloaded from the application store and the APP is installed and opened. In this scenario, it is obvious wrong to count the newly-added user of the APP if the application store is taken as the source channel according to the channel information carried in the installation package. In the manner provided by the present disclosure, since the interval between the time when the APP is opened for the first time and the installation time is very small, smaller than the preset duration threshold, the source channel of the APP will be determined according to the information of the operation activity A transferred by the link of the webpage of the operation activity A.

According to embodiments of the present disclosure, the present disclosure further provides an electronic device and a readable storage medium.

Figure 6:
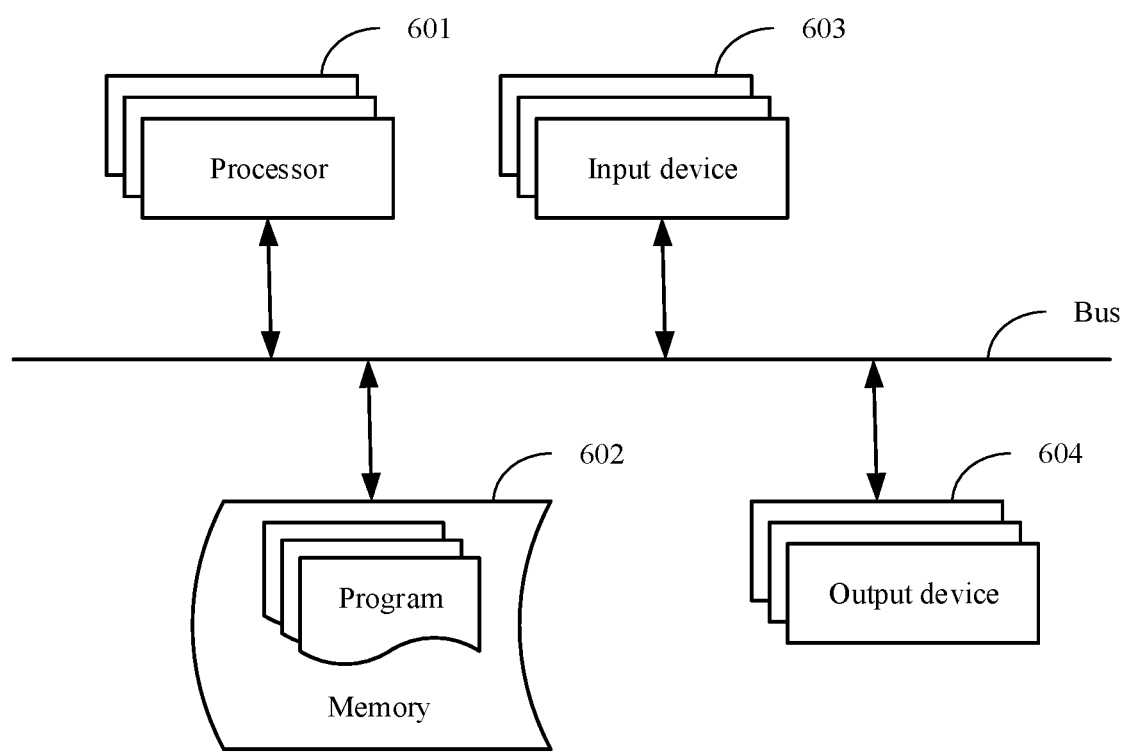
FIG. 6 illustrates a block diagram of an electronic device for implementing the method according to embodiments of the present disclosure.

As shown in FIG. 6, it shows a block diagram of an electronic device for implementing the method for determining a source channel according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 6, the electronic device comprises: one or more processors 601, a memory 602, and interfaces configured to connect components and including a high-speed interface and a low speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 601 is taken as an example in FIG. 6.

The memory 602 is a non-transitory computer-readable storage medium provided by the present disclosure. The memory stores instructions executable by at least one processor, so that the at least one processor executes the method for determining a source channel according to the present disclosure. The non-transitory computer-readable storage medium of the present disclosure stores computer instructions, which are used to cause a computer to execute the method for determining a source channel according to the present disclosure.

The memory 602 is a non-transitory computer-readable storage medium and can be used to store non-transitory software programs, non-transitory computer executable programs and modules, such as program instructions/modules (e.g., relevant modules shown in FIG. 4 and FIG. 5) corresponding to the method for determining a source channel according to embodiments of the present disclosure. The processor 601 executes various functional applications and data processing of the server, i.e., implements the method for determining a source channel according to embodiments of the present disclosure, by running the non-transitory software programs, instructions and modules stored in the memory 602.

The memory 602 may include a storage program region and a storage data region, wherein the storage program region may store an operating system and an application program needed by at least one function; the storage data region may store data created by the use of the electronic device for implementing the item-recommending method or the method for training the model of the task of the user clicking the item. In addition, the memory 602 may include a high-speed random access memory, and may also include a non-transitory memory, such as at least one magnetic disk storage device, a flash memory device, or other non-transitory solid-state storage device. In some embodiments, the memory 602 may optionally include a memory remotely arranged relative to the processor 601, and these remote memories may be connected to the electronic device for implementing the item-recommending method or the method for training the model of the task of the user clicking the item through a network. Examples of the above network include, but are not limited to, the Internet, an intranet, a local area network, a mobile communication network, and combinations thereof.

The electronic device may further include an input device 603 and an output device 604. The processor 601, the memory 602, the input device 603 and the output device 604 may be connected through a bus or in other manners. In FIG. 6, the connection through the bus is taken as an example.

The input device 603 may receive inputted numeric or character information and generate key signal inputs related to user settings and function control of the electronic device for implementing the item-recommending method or the method for training the model of the task of the user clicking the item, and may be an input device such as a touch screen, keypad, mouse, trackpad, touchpad, pointing stick, one or more mouse buttons, trackball and joystick. The output device 604 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method of determining a source channel, wherein the method comprises:
    determining an interval between a time when an application is opened for the first time and an installation time of the application;
    if the interval exceeds a preset duration threshold, determining a source channel of the application according to channel information carried by an installation package of the application;
    if the interval does not exceed the preset duration threshold, determining the source channel of the application according to channel information transferred to the application when the application is opened for the first time,
    wherein:
    if a manner in which the application is opened for the first time is that the application is awoken through a webpage or by pushing, the channel information is transferred to the application through a link included in the webpage or push;
    if a manner in which the application is opened for the first time is that the application is opened manually, the channel information is transferred to the application by a clipboard.

2. The method according to claim 1, wherein the method is implemented when the application is opened for the first time, and the method further comprises:
    sending, by the application, the information including the source channel to a server side so that the server side counts a newly-added user of the application.

3. A method of determining a source channel, wherein the method comprises:
    determining an interval between a time when an application is opened for the first time and an installation time of the application;
    if the interval exceeds a preset duration threshold, determining a source channel of the application according to channel information carried by an installation package of the application;
    if the interval does not exceed the preset duration threshold, determining the source channel of the application according to channel information transferred to the application when the application is opened for the first time, wherein the method is implemented by a server side to count a newly-added user of the application;
    the method further comprises:
    receiving, by the server side, information uploaded when the application is opened for the first time, the information comprising: the time when the application is opened for the first time, the installation time of the application, an application-opening manner, the channel information carried by the installation package of the application and the channel information transferred to the application when the application is opened for the first time.

4. The method according to claim 2, wherein the information further comprises: an identifier of the application and an identifier of a terminal device;
    the method further comprises:
    judging, by the server side, whether the application is installed on the terminal device for the first time according to the identifier of the application and the identifier of the terminal device, and if YES, counting a newly-added user of the application by using the information of the source channel.

5. The method according to claim 3, wherein the information further comprises: an identifier of the application and an identifier of a terminal device;
    the method further comprises:
    judging, by the server side, whether the application is installed on the terminal device for the first time according to the identifier of the application and the identifier of the terminal device, and if YES, counting a newly-added user of the application by using the information of the source channel.

6. The method according to claim 1, wherein the method further comprises:
    if the channel information transferred to the application is not obtained when the application is opened for the first time, determining the source channel of the application according to the channel information carried by the installation package of the application.

7. An electronic device, comprising:
    at least one processor; and
    a memory communicatively connected with the at least one processor;
    wherein the memory stores instructions executable by the at least one processor, and the instructions are executed by the at least one processor to enable the at least one processor to perform a method of determining a source channel, wherein the method comprises:
    determining an interval between a time when an application is opened for the first time and an installation time of the application;
    if the interval exceeds a preset duration threshold, determining a source channel of the application according to channel information carried by an installation package of the application;
    if the interval does not exceed the preset duration threshold, determining the source channel of the application according to channel information transferred to the application when the application is opened for the first time,
    wherein:
    if a manner in which the application is opened for the first time is that the application is awoken through a webpage or by pushing, the channel information is transferred to the application through a link included in the webpage or push;
    if the manner in which the application is opened for the first time is that the application is opened manually, the channel information is transferred to the application by a clipboard.

8. The electronic device according to claim 7, wherein the method is implemented when the application is opened for the first time, and the method further comprises:
sending, by the application, the information including the source channel to a server side so that the server side counts a newly-added user of the application.

9. An electronic device, comprising:
at least one processor; and
a memory communicatively connected with the at least one processor;
wherein the memory stores instructions executable by the at least one processor, and the instructions are executed by the at least one processor to enable the at least one processor to perform a method of determining a source channel, wherein the method comprises:
determining an interval between a time when an application is opened for the first time and an installation time of the application;
if the interval exceeds a preset duration threshold, determining a source channel of the application according to channel information carried by an installation package of the application;
if the interval does not exceed the preset duration threshold, determining the source channel of the application according to channel information transferred to the application when the application is opened for the first time, wherein the method is implemented by a server side to count a newly-added user of the application;
the method further comprises:
receiving, by the server side, information uploaded when the application is opened for the first time, the information comprising: the time when the application is opened for the first time, the installation time of the application, an application-opening manner, the channel information carried by the installation package of the application and the channel information transferred to the application when the application is opened for the first time.

10. The electronic device according to claim 8, wherein the information further comprises: an identifier of the application and an identifier of a terminal device;
the method further comprises:
judging, by the server side, whether the application is installed on the terminal device for the first time according to the identifier of the application and the identifier of the terminal device, and if YES, counting a newly-added user of the application by using the information of the source channel.

11. The electronic device according to claim 9, wherein the information further comprises: an identifier of the application and an identifier of a terminal device;
the method further comprises:
judging, by the server side, whether the application is installed on the terminal device for the first time according to the identifier of the application and the identifier of the terminal device, and if YES, counting a newly-added user of the application by using the information of the source channel.

12. The electronic device according to claim 7, wherein the method further comprises:
if the channel information transferred to the application is not obtained when the application is opened for the first time, determining the source channel of the application according to the channel information carried by the installation package of the application.

13. A non-transitory computer readable storage medium with computer instructions stored thereon, wherein the computer instructions are used for causing a computer to perform a method of determining a source channel, wherein the method comprises:
determining an interval between a time when an application is opened for the first time and an installation time of the application;
if the interval exceeds a preset duration threshold, determining a source channel of the application according to channel information carried by an installation package of the application;
if the interval does not exceed the preset duration threshold, determining the source channel of the application according to channel information transferred to the application when the application is opened for the first time,
wherein:
if a manner in which the application is opened for the first time is that the application is awoken through a webpage or by pushing, the channel information is transferred to the application through a link included in the webpage or push;
if a manner in which the application is opened for the first time is that the application is opened manually, the channel information is transferred to the application by a clipboard.

14. The non-transitory computer readable storage medium according to claim 13, wherein the method is implemented when the application is opened for the first time, and the method further comprises:
sending, by the application, the information including the source channel to a server side so that the server side counts a newly-added user of the application.

15. A non-transitory computer readable storage medium with computer instructions stored thereon, wherein the computer instructions are used for causing a computer to perform a method of determining a source channel, wherein the method comprises:
determining an interval between a time when an application is opened for the first time and an installation time of the application;
if the interval exceeds a preset duration threshold, determining a source channel of the application according to channel information carried by an installation package of the application;
if the interval does not exceed the preset duration threshold, determining the source channel of the application according to channel information transferred to the application when the application is opened for the first time, wherein the method is implemented by a server side to count a newly-added user of the application;
the method further comprises:
receiving, by the server side, information uploaded when the application is opened for the first time, the information comprising: the time when the application is opened for the first time, the installation time of the application, an application-opening manner, the channel information carried by the installation package of the application and the channel information transferred to the application when the application is opened for the first time.

16. The non-transitory computer readable storage medium according to claim 14, wherein the information further comprises: an identifier of the application and an identifier of a terminal device;
the method further comprises:
judging, by the server side, whether the application is installed on the terminal device for the first time according to the identifier of the application and the identifier of the terminal device, and if YES, counting a newly-added user of the application by using the information of the source channel.

17. The non-transitory computer readable storage medium according to claim 13, wherein the method further comprises:
if the channel information transferred to the application is not obtained when the application is opened for the first time, determining the source channel of the application according to the channel information carried by the installation package of the application.

\* \* \* \* \*